(12) United States Patent
Sharma et al.

(10) Patent No.: US 10,882,613 B2
(45) Date of Patent: Jan. 5, 2021

(54) UNMANNED AERIAL VEHICLE-MOUNTED APPARATUS

(71) Applicant: Verizon Patent and Licensing Inc., Basking Ridge, NJ (US)

(72) Inventors: Nityanand Sharma, Tampa, FL (US); Girish Nair, Lutz, FL (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 621 days.

(21) Appl. No.: 15/710,446

(22) Filed: Sep. 20, 2017

(65) Prior Publication Data

US 2019/0084670 A1   Mar. 21, 2019

(51) Int. Cl.
    *B64C 39/02*   (2006.01)
(52) U.S. Cl.
    CPC ...... *B64C 39/024* (2013.01); *B64C 2201/108* (2013.01); *B64C 2201/127* (2013.01); *B64C 2201/141* (2013.01)
(58) Field of Classification Search
    CPC ........ B64C 2201/123; B64C 2201/127; B64C 2201/12; B64C 2201/128; B64C 2201/126; G03B 15/006; G03B 15/02; F16M 13/02; G08B 13/19602; G08B 13/19617; G08G 1/0175; G08G 1/054

USPC ......... 52/648.1, 650.1, 653.1, 653.2; 396/12, 396/419, 427
    See application file for complete search history.

(56) References Cited

U.S. PATENT DOCUMENTS

| 9,561,870 | B2 * | 2/2017 | Zhou | B64D 47/08 |
| 9,789,976 | B2 * | 10/2017 | Zhou | B64D 47/08 |
| 2015/0097950 | A1 * | 4/2015 | Wang | H04N 5/2254 348/144 |
| 2016/0119546 | A1 * | 4/2016 | Wang | H04N 5/2252 348/144 |
| 2016/0229556 | A1 * | 8/2016 | Zhou | H04N 5/2328 |
| 2017/0106998 | A1 * | 4/2017 | Zhou | F16M 11/10 |

OTHER PUBLICATIONS

M. West, "Four-Bar Linkages," Dynamics, http://dynref.engr.illinois.edu/aml.html, 2012-2015, 9 pages.

* cited by examiner

*Primary Examiner* — Philip J Bonzell

(57) ABSTRACT

A device can include an unmanned aerial vehicle (UAV) frame physically connected to a UAV, two or more support arms connected to and extending from the frame, a first servomotor coupled to a first support arm and providing rotatable movement of the first support arm in a first plane; a second servomotor coupled to a second support arm and providing rotatable movement of the second support arm in a second plane, a second frame connected to the support arms, and an end effector connected to the second frame.

20 Claims, 12 Drawing Sheets

UNMANNED AERIAL VEHICLE-MOUNTED APPARATUS

BACKGROUND

Unmanned aerial vehicles (UAVs) are often operated in a variety of areas, by a variety of users, and for a variety of purposes. For example, UAVs can be used for recreational entertainment purposes, aerial delivery services, aerial photography, and/or the like.

DETAILED DESCRIPTION OF PREFERRED EMBODIMENTS

Figure 1:
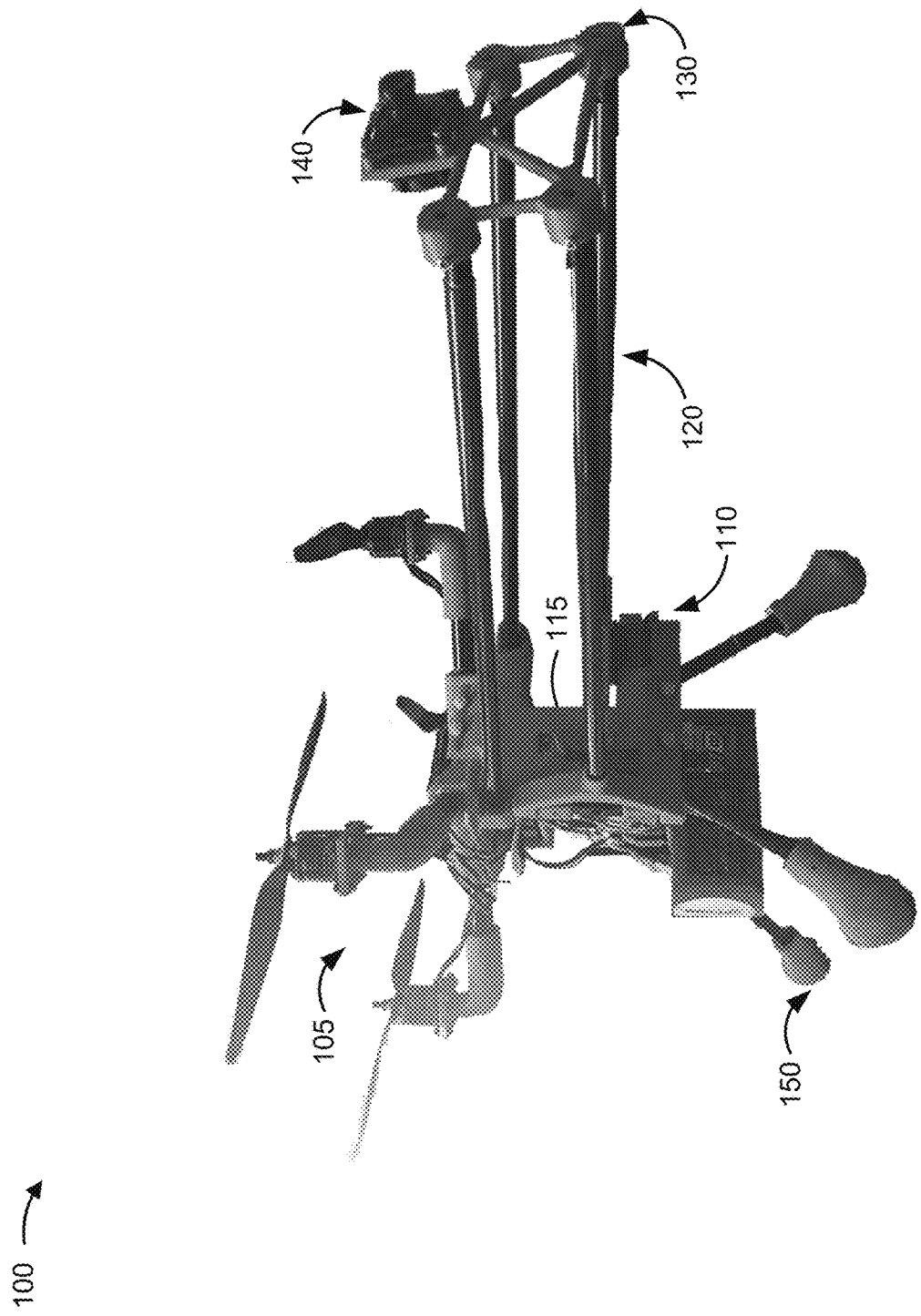
FIG. 1 is a diagram of an overview of an example implementation of a UAV-mounted apparatus described herein.

The following detailed description of example implementations refers to the accompanying drawings. The same reference numbers in different drawings can identify the same or similar elements.

While unmanned aerial vehicles (UAVs) can be flown for a variety of purposes, the use of UAVs is often limited by the manner in which UAVs are designed. For example, UAVs are often lightweight machines with multiple rotors and are designed for fairly precise balance to achieve controlled flight. The rotors of a UAV can limit how close a UAV can safely get to various objects, the power of a UAV can limit potential payloads or carrying capacity of a UAV, and balance considerations can limit the manner in which an object is attached to or carried by a UAV.

In addition, UAVs are often used in open spaces with relatively few obstructions between a UAV and its controller, and few obstructions between a UAV's origin location and its destination location. The success of UAV operations within an enclosed space can be hindered by a variety of factors, including potential loss of signal (e.g., global positioning satellite (GPS) signal, control signal, or the like), navigational hazards (e.g., walls, ceilings, fixtures, people, and/or the like), and/or the like.

Some implementations, described herein, provide a UAV-mounted apparatus for manipulating objects. For example, the UAV-mounted apparatus can include multiple arms extending from the UAV and connected at one end to servomotors for controlling the arms while connected at the opposite end to an end effector (e.g., a tool for performing a particular job). The servomotors can adjust the arms to position the end effector as appropriate for performing a job. In addition, the UAV-mounted apparatus can include one or more counterweights for balance. By way of example, a UAV-mounted apparatus can include four arms extending from a UAV, two servomotors connected at one end of two of the four arms to provide two degrees of freedom to an end effector mounted at the opposite end of the arms. The end effector can be a tool, such as a tool for grabbing an object, and the counterweight can be designed to compensate for force applied by and/or a payload grabbed by the end effector.

Some implementations, described herein, provide a UAV command and control component for performing jobs using the UAV-mounted apparatus for manipulating objects. UAV command and control component can, for example, be designed to work with other UAV components so that the UAV-mounted apparatus can operate within an enclosed space, such as a building, as well as in open spaces. For example, the UAV command and control component can receive instructions for performing a job using the end effector of the UAV-mounted apparatus, identify the job location (e.g., using a map of the area that includes the job location), and cause the UAV to navigate to the job location (e.g., using the map of the area and indoor antennas for positioning and navigating). Once at the job location, the UAV command and control component can identify the subject of the job (e.g., using an on-board camera and image recognition techniques), and cause the end effector of the UAV-mounted apparatus to perform an action associated with the subject of the job.

By way of example, a UAV-mounted apparatus can be mounted on a UAV and provided within a data center building that includes many rows of frames and cables connected to patch panels included in the frames. The UAV command and control component of the UAV can receive instructions to unplug a cable from one port of a patch panel and plug the cable into a different port of a different patch panel at a different frame. Using a map of the data center building, and location triangulation techniques based on signals associated with multiple indoor antennas, the UAV command and control component can cause the UAV to navigate to a location where the cable is located. Once at the job location, the UAV command and control component can cause the UAV-mounted apparatus to unplug the cable, navigate to the location where the cable is to be plugged in, cause the UAV-mounted apparatus to plug in the cable, and navigate to a landing location for the UAV.

Some implementations described herein can enable a UAV to perform tasks, or jobs, which would otherwise not be possible or practicable for a UAV, another device, or a person. For example, the UAV equipped with the UAV-mounted apparatus can perform jobs in areas where it might be difficult or dangerous for other equipment, or for humans, to operate. In addition, the UAV-mounted apparatus can enable the UAV to perform jobs that another UAV might not be able to perform, such as jobs that require lateral manipulation of objects. The ability to perform such jobs and tasks can increase the usefulness of UAVs equipped with the UAV-mounted apparatus and increase the efficiency of entities that put the UAV-mounted apparatus to use for performing various jobs.

Some implementations described herein can enable the UAV and the UAV-mounted apparatus to perform jobs in situations where standard navigational signals, such as GPS, are not reliable and/or precise enough. For example, a UAV command and control module can be used to navigate the UAV in an enclosed space, such as a building, to perform jobs that other UAVs or other equipment might not be able to perform. The use of the UAV command and control module can further increase the usefulness of UAVs and the efficiency of entities that put such UAVs, including UAVs equipped with UAV-mounted apparatus, to use for performing various jobs.

FIG. 1 is a diagram of an overview of an example implementation 100 of a UAV-mounted apparatus 110 described herein. As shown in FIG. 1, example implementation 100 can include a UAV equipped with a UAV-mounted apparatus for manipulating objects.

As shown in FIG. 1, a UAV-mounted apparatus 110 can be connected to a UAV 105 by mounting a frame 115 of the apparatus to a UAV. Frame 115 can include and/or be connected to a variety of features and/or components of UAV-mounted apparatus 110. For example, frame 115 can include connection mechanisms (e.g., bracket(s), brace(s), joint(s), and/or the like) for physically connecting UAV-mounted apparatus 110 to the UAV, one or more electrical components for electrically coupling UAV-mounted apparatus 110 to UAV 105, one or more servo motors, and/or one or more arms. Frame 115 can include other features as well, such as a housing for a camera and connection mechanisms for landing gear and/or counterweight(s).

As further shown in FIG. 1, UAV-mounted apparatus 110 can include arms 120 that can connect frame 115 of UAV-mounted apparatus 110 to a frame 130 for an end effector 140. In some implementations, arms 120 can be connected to frame 115 and frame 130 directly using a connection mechanism (e.g., bracket(s), brace(s), joint(s), and/or the like) or through another component, such a servomotor yoke. In example implementation 100, UAV-mounted apparatus 110 includes four arms 120, although more or less arms 120 could be used. Two of the example arms 120 are connected directly to UAV-mounted apparatus 110, while another two of the example arms 120 are connected to corresponding yokes of two servomotors. Arms 120 can provide support for frame 130 (e.g., helping to keep it steady), and can also permit end effector 140 to be moved relative to UAV 105 (e.g., using the servomotors to adjust the angle of the arms). Some or all of arms 120 can be substantially parallel to one another and/or substantially similar in length, e.g., in a manner designed to hold frame 130 at a distance from frame 115 of UAV-mounted apparatus 110. The end effector frame 130 is connected to arms 120 and provides support for the end effector and connection mechanisms for connecting the end effector frame 130 to arms 120 and/or the end effector.

As further shown in FIG. 1, end effector 140 is connected to frame 130 (e.g., using connection mechanisms such as bracket(s), brace(s), joint(s), and/or the like). End effector 140 can be a tool for performing a job, such as a grabbing tool, a cutting tool, a drawing tool, a camera, and/or the like.

As further shown in FIG. 1, UAV-mounted apparatus 110 can include one or more counterweights 150. Counterweights 150 depicted in example implementation 100 are included in landing gear for UAV 105. For example, legs extending from UAV 105 can incorporate counterweights 150, and/or be varied in length, in a manner designed to achieve a desired balance during flight and/or when performing a job using end effector 140.

UAV-mounted apparatus 110 can increase the usefulness of UAV 105 by enabling UAV 105 to be used to perform jobs that UAV 105 might not otherwise be able to perform, such as jobs requiring manipulation of objects and/or reaching objects laterally and proximate to UAV 105. The additional utility provided by UAV-mounted apparatus 110 can also enable UAV operators to perform jobs in a manner that could be more efficient and/or safer than those jobs would otherwise be performed.

As indicated above, FIG. 1 is provided merely as an example. Other examples are possible and can differ from what was described with regard to FIG. 1.

Figure 2A:
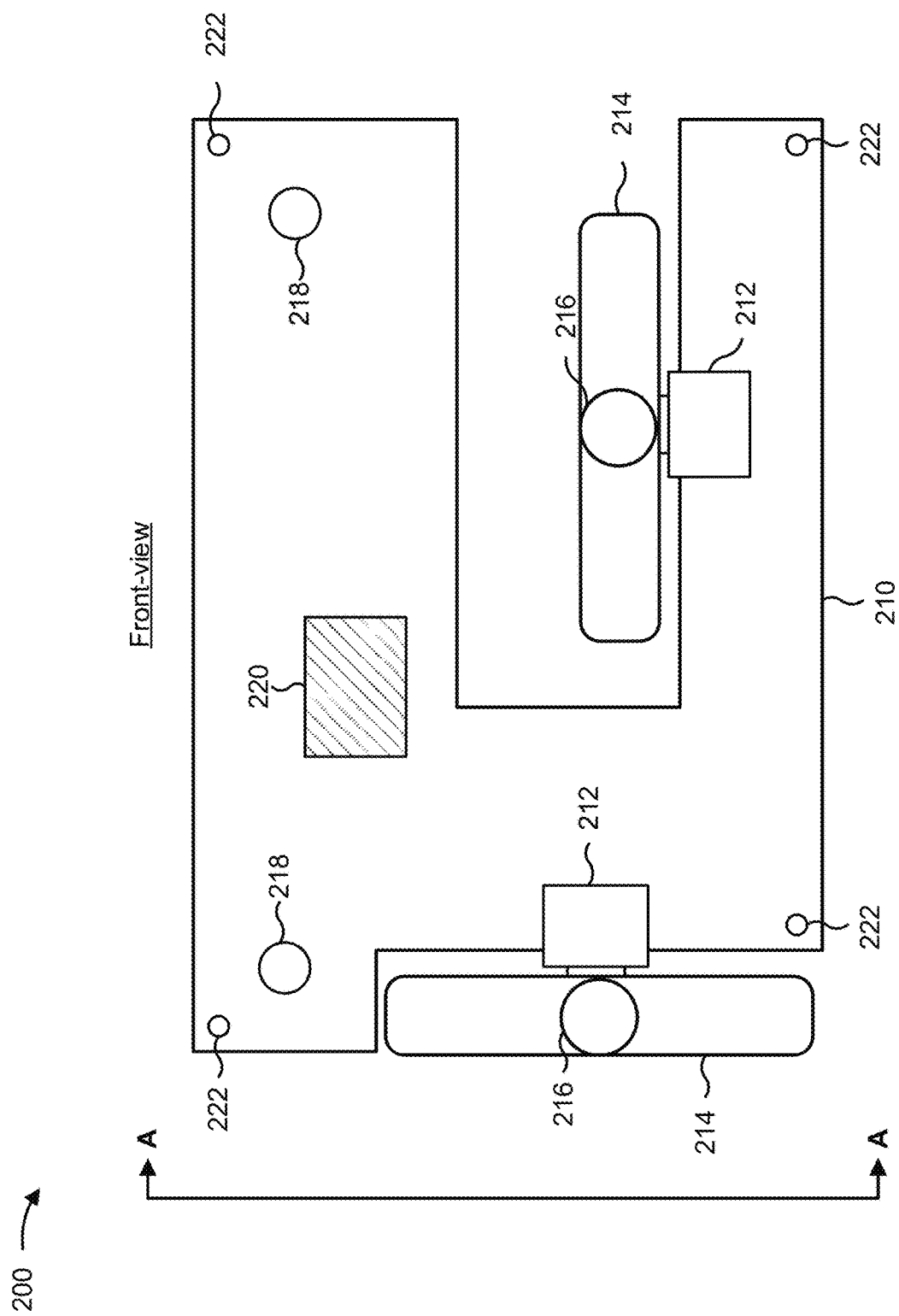
FIGS. 2A and 2B are diagrams of an example implementation of a UAV frame of the UAV-mounted apparatus shown in FIG. 1.
Figure 2B:
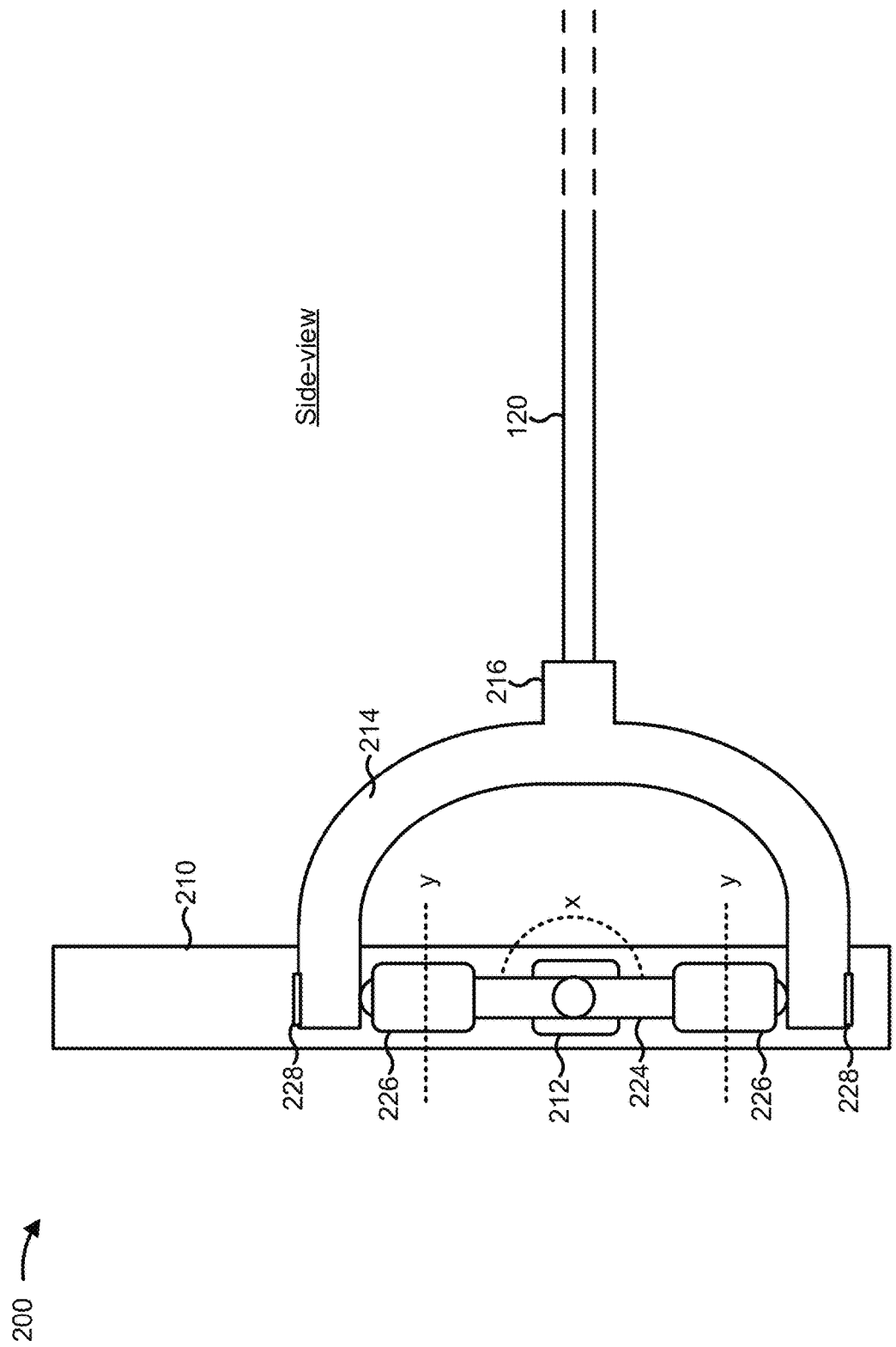

FIGS. 2A and 2B are diagrams of an example implementation 200 of frame 115 of UAV-mounted apparatus 110 shown in FIG. 1. FIG. 2A depicts a front-view of an example frame 115 of UAV-mounted apparatus 110. FIG. 2B depicts a side view (e.g., 90-degree lateral rotation of the front-view of the example frame 115) of the example frame 115 of UAV-mounted apparatus 110, the side view being taken along the line AA of FIG. 2A. The example UAV frame 115, including components and other features of the example UAV frame 115, can be constructed of a variety of materials, such as polymer-based material (e.g., acrylonitrile butadiene styrene (ABS) plastic), metallic materials, wood-based materials, carbon-fiber based materials, and/or the like. The frame 115 can have a variety of shapes and sizes that might depend, for example, on the shape and size of UAV 105 and UAV-mounted apparatus 110. For example, a larger UAV 105 and/or UAV-mounted apparatus 110 might require a larger frame.

As shown in FIG. 2A, the example frame 115 includes a frame plate 210 for supporting other features of the example frame 115. Frame plate 210 is designed to be fixed, permanently or removably, to UAV 105. Frame plate 210 can include or be connected to various components such as one or more servomotors 212, one or more yokes 214, one or more yoke arm connectors 216, one or more frame arm connectors 218, one or more equipment housings 220, and/or one or more UAV connectors 222.

Two servomotors 212 (i.e., "servos") can be mounted to frame plate 210. Servomotor 212 can be a rotary actuator that enables control of angular positioning of a servo horn (e.g., an arm attached to the output shaft of servomotor 212). Servomotor 212 can include a motor (e.g., a high voltage coreless motor, a brush-type direct current motor, or the like) coupled to a sensor for position feedback. Servomotor 212 can be controlled by a control device, which can be included in a flight controller of UAV 105 to which frame plate 210 is mounted or a separate device in communication with UAV 105.

While example implementation 200 depicts two servomotors 212, in some implementations, one servomotor 212 can be used, and in some implementations more than two servomotors 212 can be used. Each servomotor 212 can, in some implementations, provide one degree of freedom (e.g., rotation in a plane perpendicular to a surface of frame plate 210). Accordingly, servomotors 212 in the example implementation 200 can provide two degrees of freedom which, in this example, includes rotation in a plane perpendicular to each other and perpendicular to a surface of frame plate 210.

Each of the two yokes 214 can connect to one of servomotors 212. In some implementations, yoke 214 can be connected to a horn of servomotor 212, enabling yoke 214 to rotate in a manner similar to that of servomotor 212 horn (e.g., rotation in a plane perpendicular to the surface of frame plate 210). In some implementations, yoke 214 can be connected to the horn of servomotor 212 in a manner designed to enable rotation in substantially the same plane as the rotation of another servomotor 212. For example, yoke 214 can be connected to a horn of servomotor 212 using a combination of bearings and servo horn covers that enables yoke 214 to rotate independently from the rotation of servomotor 212 horn (e.g., rotation of yoke 214 in a plane perpendicular to the surface of frame plate 210 and perpendicular to the plane of rotation of servomotor 212 horn).

While example implementation 200 depicts two yokes 214, in some implementations one yoke 214 can be used, and in some implementations more than two yokes 214 can be used. In some implementations, UAV-mounted apparatus 110 can include one yoke 214 for each servomotor 212.

Each of the two yoke arm connectors 216 can connect to one of yokes 214. In some implementations, yoke arm connector 216 can be included in yoke 214 (e.g., by molding yoke 214 to include yoke arm connector 216), and in some implementations yoke arm connector 216 can be fastened to yoke 214. Yoke arm connector 216 can include any type of connector suitable for connecting to arm 120 (e.g., that includes a substantially rigid rod, bar, pole, or similar type of support structure for extending from yoke 214 in a manner designed to support end effector 140 and frame 130). Yoke arm connector 216 can take a variety of forms, including forms for providing a fixed or movable connection with arm 120, such as a hole for receiving an end of arm 120 (e.g., and for fastening with glue, tape, and/or the like), holes for receiving one or more fasteners (e.g., screw(s), nail(s), bolt(s), and/or the like), a universal joint, a turnbuckle, screw joint, and/or the like.

Each of the two frame arm connectors 218 can connect to frame plate 210. In some implementations, frame arm connector 218 can be included in frame plate 210 (e.g., by molding frame plate 210 to include frame arm connector 218), and in some implementations frame arm connector 218 can be fastened to frame plate 210. Frame arm connector 218 can include a type of connector similar to yoke arm connector 216 described above (e.g., a form of connector for providing a fixed or movable connection with an arm). In some implementations, frame arm connector 218 can be used to connect to arm 120 of UAV-mounted apparatus 110 in the same manner as yoke arm connector 216, and in some implementations frame arm connector 218 can be used to connect to arm 120 of UAV-mounted apparatus 110 in a manner that is different from yoke arm connector 216.

While example implementation 200 includes two frame arm connectors 218, in some implementations one frame arm connector 218 can be used, and in some implementations more than two frame arm connectors 218 can be used. In implementations with multiple frame arm connectors 218, frame arm connectors 218 can be of the same type or of different types.

Equipment housing 220 can be included in frame plate 210. Equipment housing 220 can be designed to provide physical support, connectors, and/or protection for a variety of different types and/or pieces of equipment, which can be mounted to UAV-mounted apparatus 110. Equipment housing 220 can include, for example, a hole or space for fixing a camera to frame plate 210, a mount for a microphone, a connector for a wire to connect to an end effector, physical and electrical support for an end effector motor for manipulating end effector 140, connectors for fixing a sensor to frame plate 210, and/or the like. In some implementations, multiple equipment housings 220 can be included in frame plate 210, and the location of equipment housing(s) 220 within frame plate 210 can also be varied.

UAV connectors 222 can be included in the frame plate 210. UAV connectors 222 can be designed to physically fix frame plate 210 to UAV 105, providing a physical connection for UAV-mounted apparatus 110 and UAV 105. The type and number of UAV connectors 222 can vary. For example, UAV connectors 222 can include openings for receiving screws, nails, bolts, and/or parts of the UAV that can be fixed with an adhesive, such as glue and/or tape. In some implementations, UAV connectors 222 can also be used to fix other structures or equipment to frame plate 210, such as counterweight(s) and/or landing gear. While example implementation 200 depicts four UAV connectors 222, in some implementations fewer than four UAV connectors 222 can be used, and in some implementations more than four UAV connectors 222 can be used.

As noted above, FIG. 2B depicts a side view of frame 115 of UAV-mounted apparatus 110. The side-view depicts some of the same components of frame 115 as the front-view, such as frame plate 210, servomotor 212, yoke 214, and yoke arm connector 216.

In addition, FIG. 2B depicts a servo horn 224 that is connected to a rotatable portion of servomotor 212 and to yoke 214. Servo horn 224 can be rotated by the servomotor 212, for example, in a plane perpendicular to a front surface of frame plate 210. An example axis of rotation for the servo horn 224 is indicated by line x in FIG. 2B. The rotation of servo horn 224 can cause rotation of yoke 214, yoke arm connector 216, and arm 120 along the same axis of rotation as servo horn 224 (e.g., rotation along the axis indicated by line x).

FIG. 2B also depicts servo horn covers 226 and bearings 228 for rotatably connecting servo horn 224 to yoke 214. Servo horn covers 226 and bearings 228 connect servo horn 224 to yoke 214 while also providing for rotation of yoke 214 in a plane depicted by line x, perpendicular to a front face of frame plate 210 and the plane of rotation of servo horn 224. Providing an additional plane of rotation for yoke 214 can enable the yoke to rotate with multiple degrees of freedom, which can enable multiple degrees of freedom for movement of end effector 140 (e.g., one degree of freedom being vertical translation in an end effector plane provided by servomotor 212 to which yoke 214 is connected, and another degree of freedom being horizontal translation in an end effector plane provided by a second servomotor 212 connected to a second yoke 214).

FIG. 2B also depicts arm 120 that is connected to yoke arm connector 216 of yoke 214. As noted above, arm 120 can be a substantially rigid rod, bar, pole, or similar type of support structure for extending from yoke 214 in a manner designed to support end effector 140 and frame 130. In some implementations, arm 120 can be one of multiple arms 120 that can connect frame 115 of UAV-mounted apparatus 110 to frame 130 for end effector 140. In the example implementation, the arm 120 is connected to frame 130 through yoke 214 using a connection mechanism (e.g., bracket(s), brace(s), joint(s), glue, tape, and/or the like).

As indicated above, FIGS. 2A and 2B are provided merely as an example. Other examples are possible and can differ from what was described with regard to FIGS. 2A and 2B.

Figure 3A:
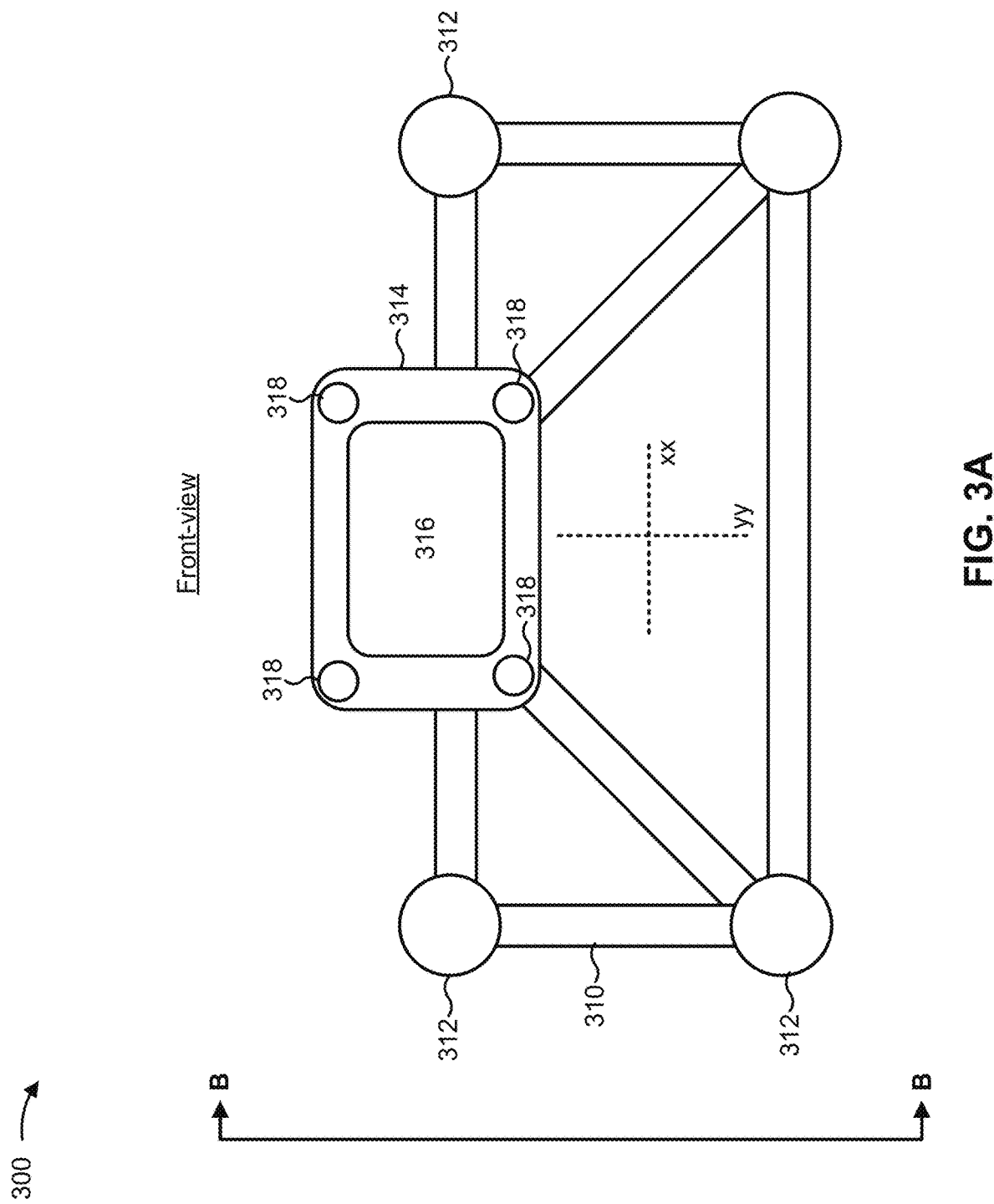
FIGS. 3A and 3B are diagrams of an example implementation of an end effector frame of the UAV-mounted apparatus shown in FIG. 1.
Figure 3B:
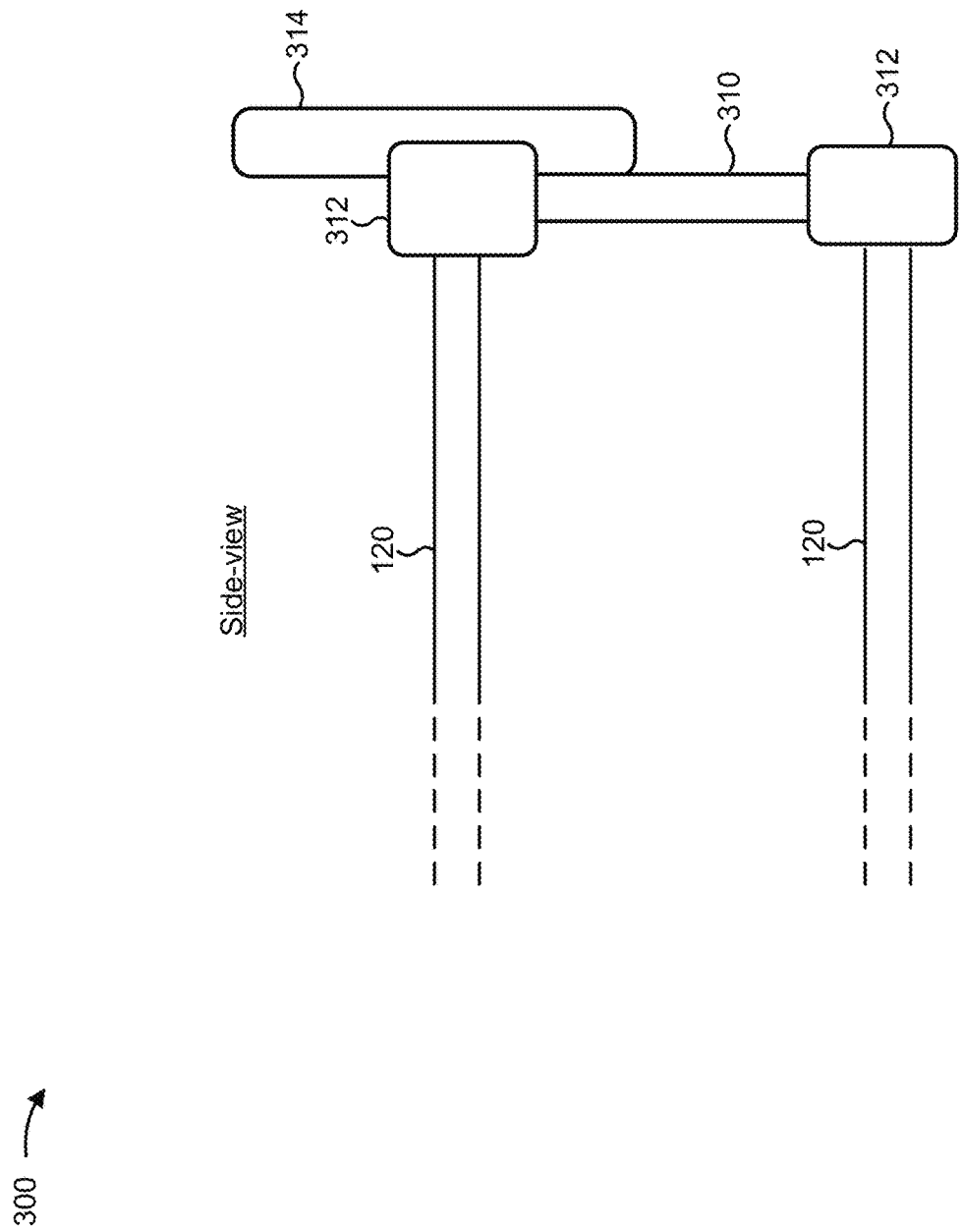

FIGS. 3A and 3B are diagrams of an example implementation 300 of an end effector frame 130 for end effector 140 of UAV-mounted apparatus 110 shown in FIG. 1. FIG. 3A depicts a front-view of frame 130, and FIG. 3B depicts a side view (e.g., 90-degree lateral rotation of the front-view) of frame 130, the side view being taken along the line BB of FIG. 3A. Frame 130, including components of frame 130, can be constructed of a variety of materials, such as polymer-based material (e.g., acrylonitrile butadiene styrene (ABS) plastic), metallic materials, wood-based materials, carbon-fiber based materials, and/or the like. Frame 130 can also be constructed in a variety of shapes and sizes, e.g., depending on the shape of UAV 105, UAV-mounted apparatus 110, number of arms 120, type of end effector 140 used, and/or the like.

As shown in FIG. 3A, frame 130 includes components for enabling arms 120 to connect to frame 130 and components for connecting end effector 140 to frame 130. In some implementations, frame 130 can have multiple degrees of freedom provided, for example, by servomotors 212 and arms 120 (e.g., enabling movement in a plane with lines of translation indicated by lines xx and yy shown in FIG. 3A). Movement of frame 130 can enable positioning of end effector 140 in a manner designed to allow end effector 140 to be used while UAV 105 is hovering.

As shown in FIG. 3A, frame 130 can include an end effector mount frame 310, arm connectors 312, an end effector support 314, an end effector housing 316, and end effector connectors 318. End effector mount frame 310 can support other components of frame 130. End effector mount frame 310 is designed to be fixed, permanently or removably, to arms 120 extending from UAV frame plate 210 of UAV-mounted apparatus 110. End effector mount frame 310 can include or be connected to various components such as arm connectors 312, end effector support 314, end effector housing 316, and/or end effector connectors 318.

Arm connectors 312 connect to arms 120 that extend from UAV frame plate 210. In some implementations, arm connectors 312 can be included in end effector mount frame 310 (e.g., by molding end effector mount frame 310 to include arm connectors 312), and in some implementations arm connectors 312 can be fastened to end effector mount frame 310. Arm connectors 312 can include a type of connector similar to yoke arm connector 216 and/or frame arm connector 218 described above (e.g., a form of connector for providing a fixed or movable connection with arm 120). In some implementations, arm connectors 312 can be used to connect to arm 120 of UAV-mounted apparatus 110 in the same manner as yoke arm connector 216 or frame arm connector 218 and in some implementations arm connectors 312 can be used to connect to arm 120 of UAV-mounted apparatus 110 in a manner that is different from yoke arm connector 216 and frame arm connector 218.

While the example implementation 300 includes four arm connectors 312, in some implementations fewer than four arm connectors 312 can be used, and in some implementations more than four arm connectors 312 can be used. In some implementations, the number of arm connectors included in frame 130 can be based on the number of yoke arm connectors 216 and frame arm connectors 218 (e.g., one arm connector 312 for yoke arm connector 216 and frame arm connector 218. In implementations with multiple arm connectors 312, arm connectors 312 can be of the same type or of different types.

End effector support 314 can physically support end effector 140. End effector support 314 can take a variety of forms (e.g., depending on end effector 140). For example, end effector support 314 can include a rectangular frame for end effector housing 316, or a hole, for receiving end effector 140. End effector connectors 318 included in end effector support 314 can enable end effector 140 to be physically fixed to frame 130. The type and number of end effector connectors 318 can vary. For example, end effector connectors 318 can include openings for receiving screws, nails, bolts, and/or parts of the end effector that can be fixed with an adhesive, such as glue and/or tape. While the example implementation 300 depicts four end effector connectors 318 included in the end effector support 314, in some implementations fewer than four end effector connectors 318 can be used, and in some implementations more than four end effector connectors 318 can be used.

As noted above, FIG. 3B depicts a side view of frame 130 of UAV-mounted apparatus 110. The side-view depicts some of the same components of frame 130 as the front-view in FIG. 3A, such as end effector mount frame 310, arm connectors 312, and end effector support 314.

FIG. 3B also depicts two arms 120 that are connected to arm connectors 312 of the example implementation 300. Arms 120, as described above, can be substantially rigid rods, bars, poles, or similar type of support structures for connecting an frame 130 to a UAV frame 115. In the example implementation 300, arms 120 can be connected to arm connectors 312 using a connection mechanism (e.g., bracket(s), brace(s), joint(s), glue, tape, and/or the like).

As indicated above, FIGS. 3A and 3B are provided merely as an example. Other examples are possible and can differ from what was described with regard to FIGS. 3A and 3B.

Figure 4A:
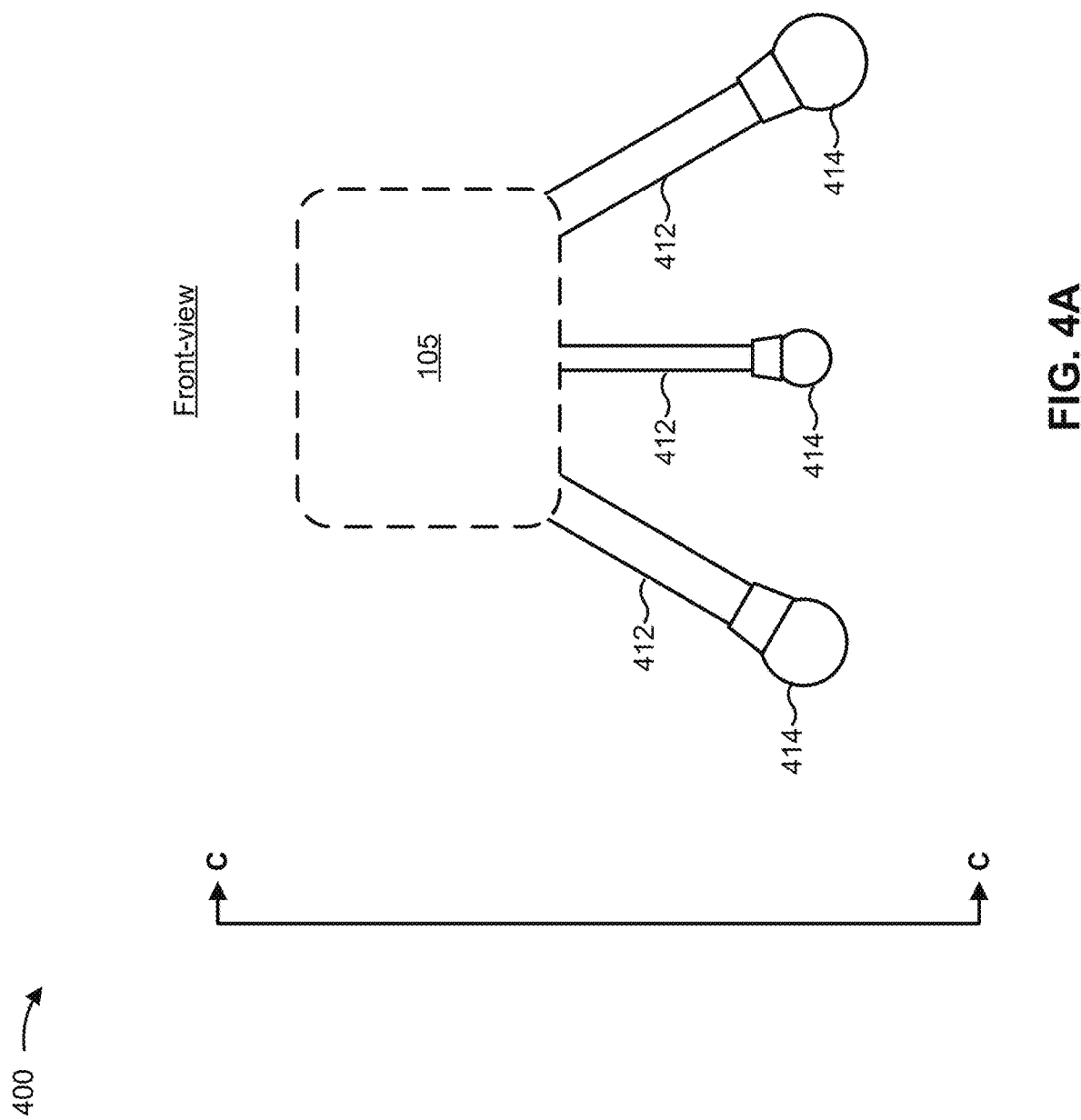
FIGS. 4A and 4B are diagrams of an example implementation of a counterweight of the UAV-mounted apparatus shown in FIG. 1.
Figure 4B:
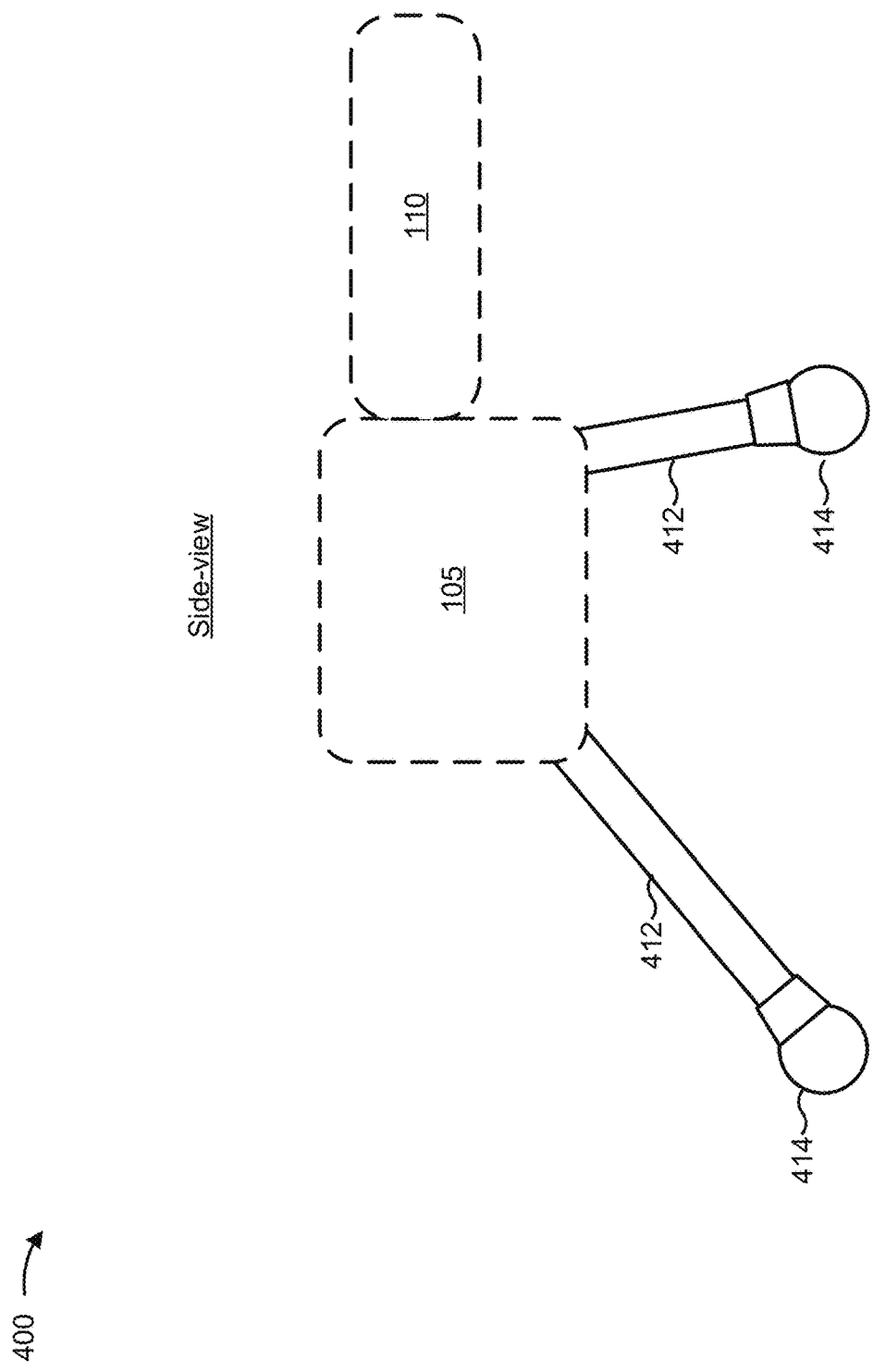

FIGS. 4A and 4B are diagrams of an example implementation 400 of counterweight 150 of UAV-mounted apparatus 110 shown in FIG. 1. FIG. 4A depicts a front-view of UAV 105 with counterweight(s) 150. FIG. 4B depicts a side-view (e.g., 90-degree lateral rotation of the front-view) of UAV 105 with counterweight(s) 150, the side view being taken along the line CC of FIG. 4A. Counterweight(s) 150, including landing gear connected to UAV 105, can be constructed of a variety of materials, such as polymer-based material (e.g., acrylonitrile butadiene styrene (ABS) plastic), metallic materials, wood-based materials, carbon-fiber based materials, and/or the like.

As shown in FIG. 4A, the example implementation 400 includes UAV 105 (e.g., which can include and/or be connected to a variety of components, including UAV-mounted apparatus 110, not shown) and landing gear for the UAV 105 which, in this example, includes three support legs 412 and three feet 414. The landing gear provides support for UAV 105 when landing and/or when UAV 105 is at rest (e.g., on the ground). Each support leg can be connected to UAV 105 in a variety of ways, and in some implementations one or more support legs can be connected to a portion of a UAV-mounted apparatus 110.

In some implementations, landing gear can include counterweight 150 to provide balance and/or stability to the UAV 105 (e.g., enabling UAV 105 to hover and fly with UAV-mounted apparatus 110 extending from the UAV 105). In example implementation 400, counterweight 150 can be included in one or more of legs 412 and/or one or more of feet 414. Alternatively, or additionally, one or more of legs 412 and/or feet 414 may function as counterweight 150. For example, at least one of legs 412 and/or feet 414 can be constructed in a particular manner and/or using particular materials designed to balance UAV 105 and any other connected components. Legs 412 and feet 414 can, for example, be hollow or solid, and can be made of materials of different densities, e.g., plastics, rubber, metals, and/or the like.

As noted above, FIG. 4B depicts a side-view of UAV 105 with counterweight(s) 150. In addition to depicting the UAV 105, legs 412, and feet 414 of the example implementation 400, FIG. 4B also depicts UAV-mounted apparatus 110.

In the example implementation 400, one of legs 412 included in the landing gear for UAV 105 provides a counterweight to counter weight of UAV-mounted apparatus 110. Leg 412, which is on the side of UAV 105 opposite UAV-mounted apparatus 110, and corresponding foot 414 can provide counterweight in a variety of ways. By way of example, leg 412 can be extended opposite UAV-mounted apparatus 110 and, in some implementations, leg 412 and/or foot 414 can be constructed in a manner that provides weight sufficient to balance the UAV 105 when in flight (e.g., constructed using relatively dense or heavy material).

As indicated above, FIGS. 4A and 4B are provided merely as an example. Many other types of counterweights can be used to provide balance to UAV 105 that is connected to UAV-mounted apparatus 110, including different types of landing gear and/or additional components connected to UAV 105. Other examples are possible and can differ from what was described with regard to FIGS. 4A and 4B.

Figure 5:
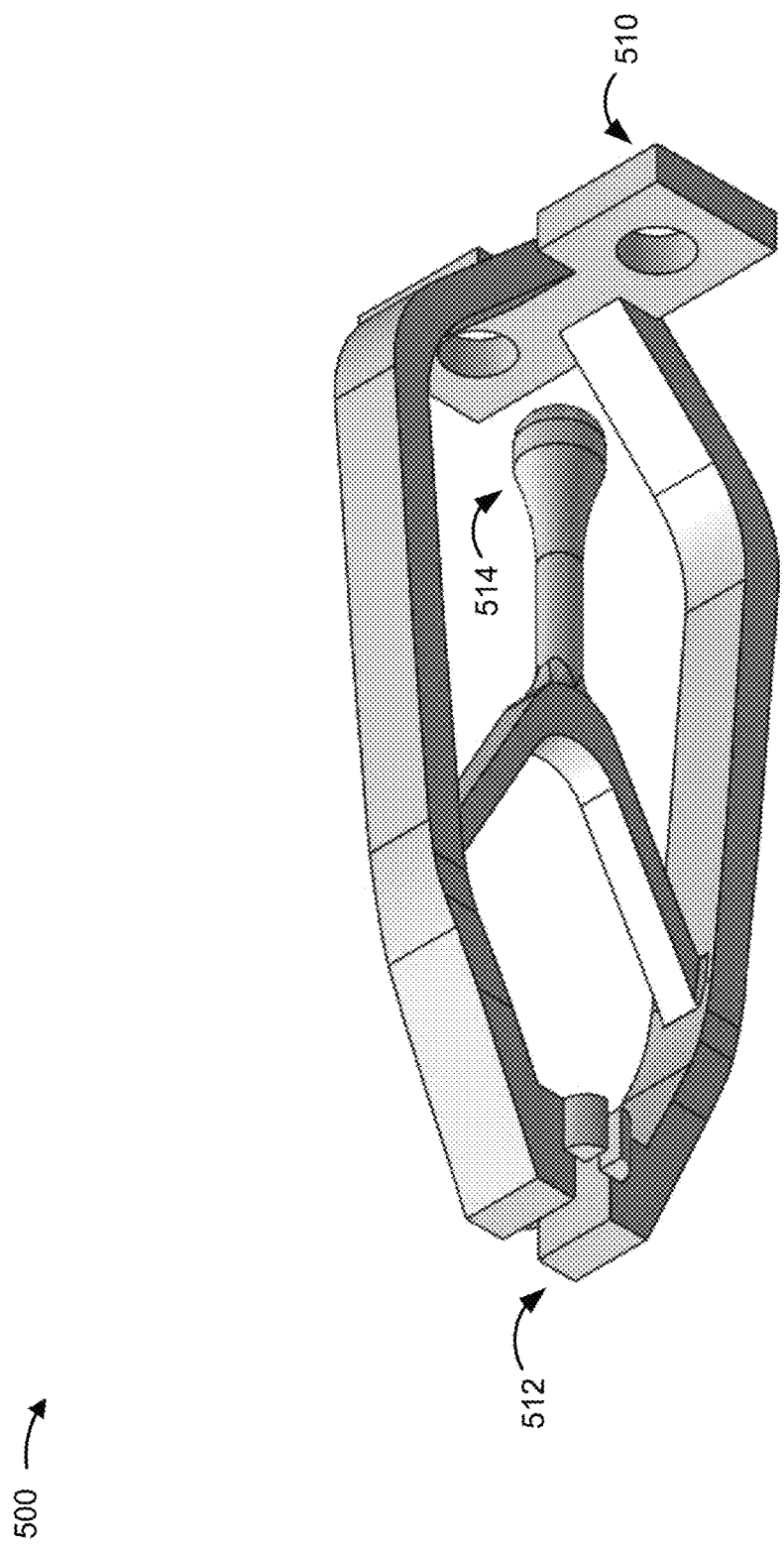
FIG. 5 is a diagram of an example implementation of an end effector of the UAV-mounted apparatus shown in FIG. 1.

FIG. 5 is a diagram of an example implementation 500 of end effector 140 of UAV-mounted apparatus 110 shown in FIG. 1. The example implementation 500 of end effector 140 includes a gripping tool for gripping objects. In this example, end effector 140 includes a connector portion 510 for connecting end effector 140 to end effector support 314 of UAV-mounted apparatus 110, a gripper portion 512 for gripping an object, and a force applicator portion 514 for applying a force that causes gripper portion 512 to open and/or close.

By way of example, end effector 140 can be mounted, via connector portion 510, to end effector support 314 of UAV-mounted apparatus 110 using one or more fasteners, such as screws, nails, bolts, and/or the like. Force applicator portion 514 can be connected to equipment (e.g., a cable can connect force applicator portion 514 to a motor housed in an equipment housing, such as equipment housing 220) in a manner designed to enable force applicator portion 514 to be pulled in a direction opposite to gripper portion 512, which can cause gripper portion 512 to grip an object, while relaxing the force applicator portion can release an object.

As indicated above, FIG. 5 is provided merely as an example. Other examples are possible and can differ from what was described with regard to FIG. 5. End effector 140 can, for example, differ in the manner in which they are connected to other portion(s) of UAV-mounted apparatus 110 (e.g., fasteners, joints, adhesives, and/or the like), end effector 140 can differ in the type of action jobs performed (e.g., grabbing an object, cutting an object, releasing an object, and/or otherwise interacting with an object), and end effector 140 can differ in the manner in which end effector 140 accomplishes actions of jobs (e.g., using motorized force, non-motorized force, electric-power, and/or the like).

Figure 6:
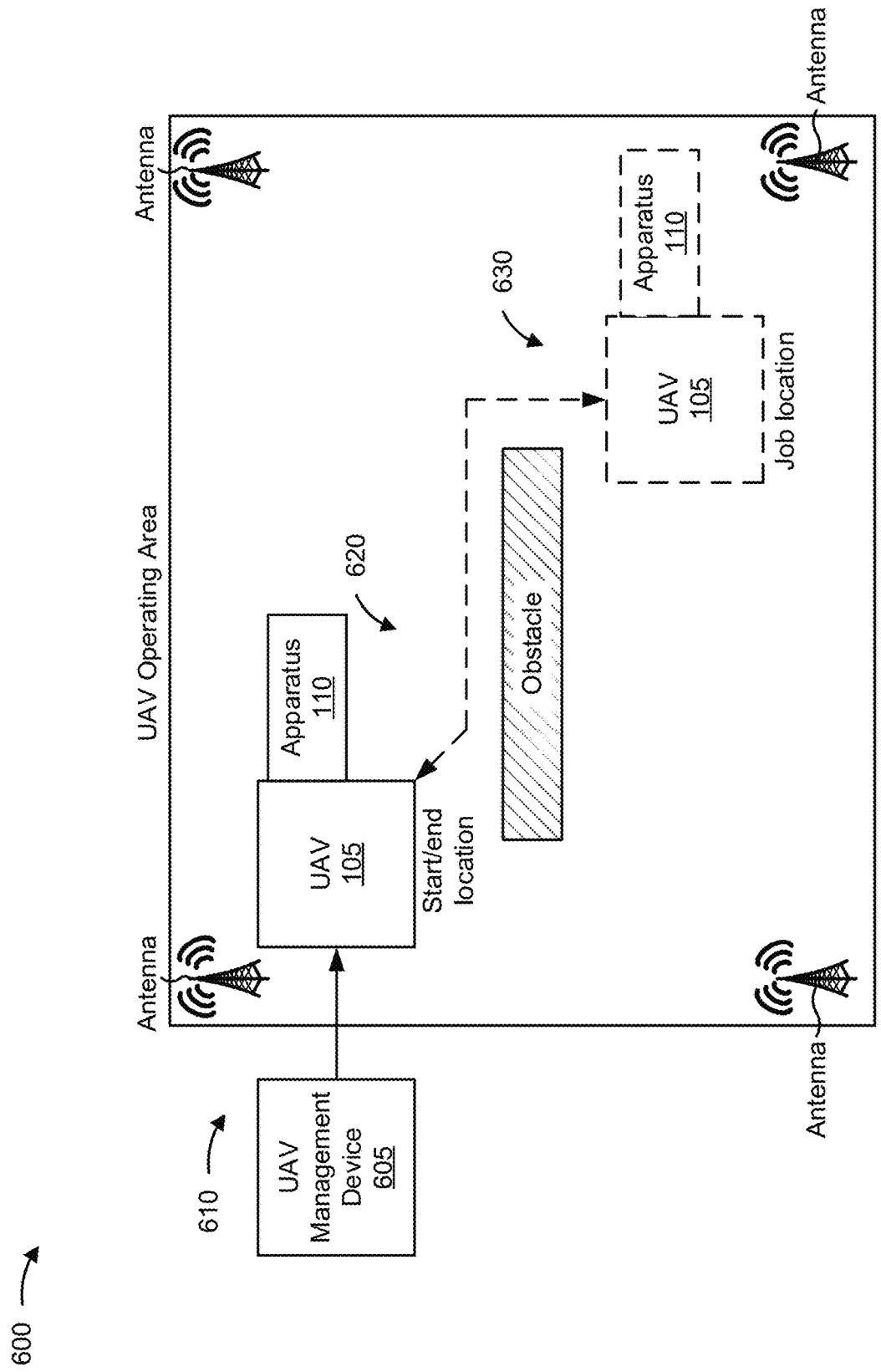
FIG. 6 is a diagram of an example environment in which systems and/or methods, described herein, can be implemented.

FIG. 6 is a diagram of an example environment 600 in which systems and/or methods, described herein, can be implemented. As shown in FIG. 6, environment 600 can include a UAV management device 605, UAV 105, and UAV-mounted apparatus 110 provided in a UAV operating area with one or more antennas (e.g., such as antennas included in wireless access points, cellular towers, and/or the like.

As shown in FIG. 6, and by reference number 610, UAV management device 605 provides UAV 105 with job data for performing a particular job, or task. The job data can include a variety of information, including a job location where the job is to be performed, a map of an area in which UAV 105 will travel to get to the job location, an end location where UAV 105 is to land after completing the job, job details indicating the manner in which the job is to be performed (e.g., which can include instructions for using UAV-mounted apparatus 110 described above), and/or the like.

By way of example, UAV 105 and UAV-mounted apparatus 110 can be deployed in a data center that includes frames of network equipment, including patch cables for carrying network data from one location to another. UAV management device 605 can send job data to UAV 105 for re-arranging one or more patch cables within the data center. The job data might include, for example, a map of the data center (e.g., including dimensions of the data center and the location of obstacles, antenna(s), and/or other objects), a first identifier for a patch cable or port for the patch cable that is to be unplugged, a second identifier for a destination port into which the patch cable is to be inserted, and an end location where UAV 105 is to land after performing the job (e.g., to recharge and/or wait for another job to perform).

As also shown in FIG. 6, and by reference number 620, UAV 105 navigates to the job location. UAV 105 can use a variety of navigational methods to get to the job location, including the use of a map of the UAV operating area (e.g., including a coordinate system designating coordinates of various features of the UAV operating area). In some implementations, UAV 105 can navigate to the job location using one or more antennas to determine a position of UAV 105 (e.g., using antenna signal strength and triangulation to determine a location of UAV 105). In this example, UAV 105 also avoids an obstacle in the UAV operating area on its way to the job location. The obstacle can be avoided in a variety of ways, including the use of one or more proximity sensors on-board UAV 105 and/or the use of a coordinate system/map that includes the location of the obstacle.

As also shown in FIG. 6, and by reference number 630, UAV 105 arrives at the job location and performs the job (e.g., the job specified in the job data provided by UAV management device 605). Using the example patch cable re-arrangement job described above, UAV 105 can (e.g., using UAV-mounted apparatus 110 and/or one or more other components of UAV 105) identify a patch cable to be removed, remove the patch cable, identify a destination for the patch cable, and insert the patch cable into the destination port.

After completing the job, UAV 105 flight can end in a variety of ways (e.g., specified in the job data and/or as determined by UAV 105). For example, UAV 105 can return to the start location and land at the location from which UAV 105 started the job, UAV 105 can land in the job location after completion of the job, or UAV 105 can land in a different location. In some implementations, UAV 105 can land in a manner designed to make UAV 105 available for another job, e.g., at a UAV battery charging station and/or within communication range of UAV management device 605.

Accordingly, the example environment 600 depicts a UAV job performance process that enables UAV 105 and UAV-mounted apparatus 110 to perform a variety of different types of jobs in a safe and efficient manner relative to processes for performing the jobs (e.g., using people or other types of machines). For example, UAV 105 and UAV-mounted apparatus 110 can fit into areas that might not otherwise be accessible or safe using other means, including the ability to fly and hover to perform jobs in relatively high location. In addition, the ability of UAV 105 to navigate using mapping and/or antenna triangulation techniques can enable indoor navigation of UAV 105 where other traditional navigation techniques (e.g., GPS signal positioning) might not be usable or accurate. This can further increase the safety and efficiency of jobs performed by UAV 105 and UAV-mounted apparatus 110.

As indicated above, FIG. 6 is provided merely as an example. Other examples are possible and can differ from what was described with regard to FIG. 6.

Figure 7:
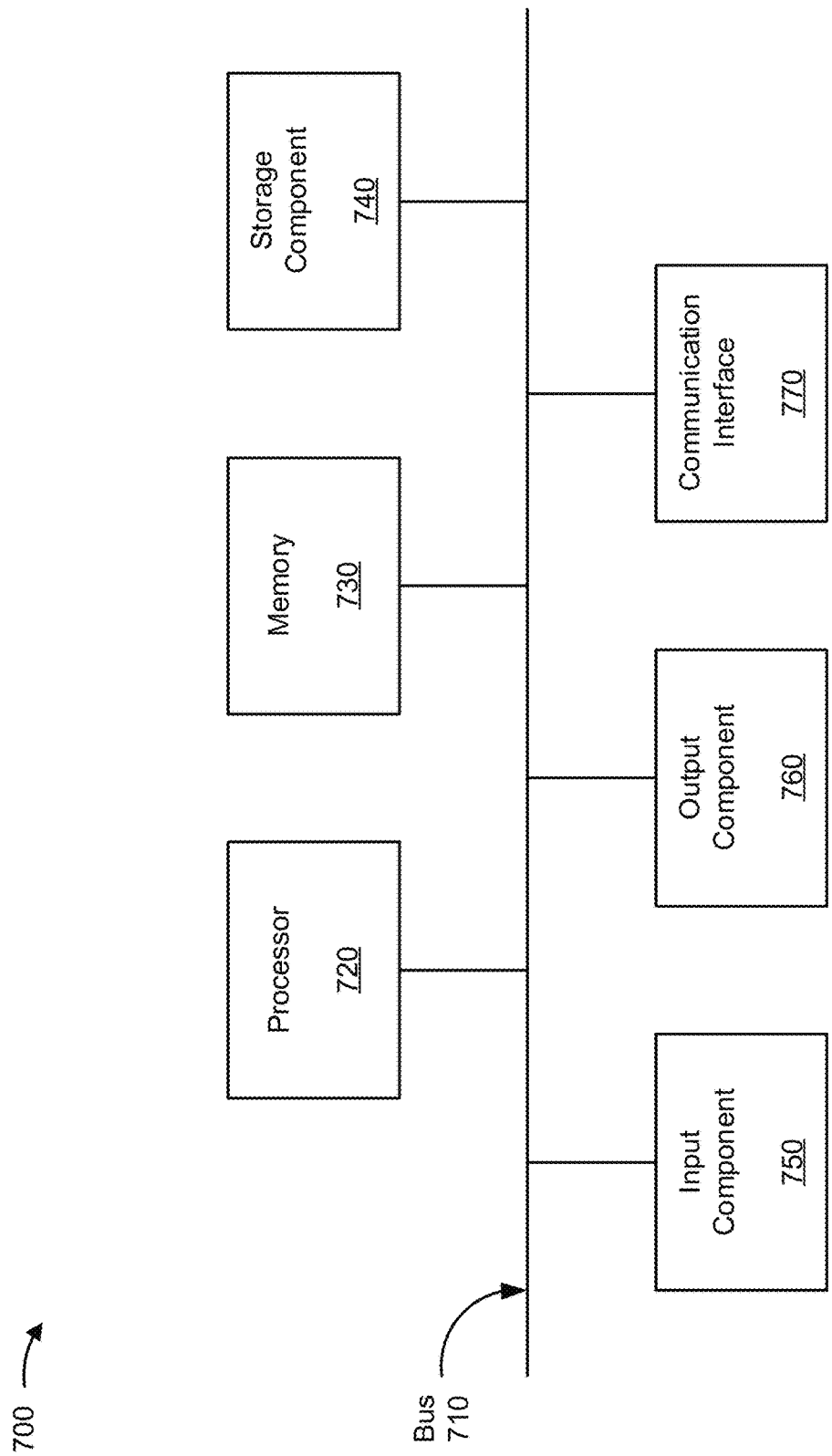
FIG. 7 is a diagram of example components a device.

FIG. 7 is a diagram of example components of a device 700. Device 700 can correspond to UAV management device 605, UAV 105, and/or UAV-mounted apparatus 110. In some implementations, UAV management device 605, UAV 105, and/or UAV-mounted apparatus 110 can include one or more devices 700 and/or one or more components of device 700. As shown in FIG. 7, device 700 can include a bus 710, a processor 720, a memory 730, a storage component 740, an input component 750, an output component 760, and a communication interface 770.

Bus 710 includes a component that permits communication among the components of device 700. Processor 720 is implemented in hardware, firmware, or a combination of hardware and software. Processor 720 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 720 includes one or more processors capable of being programmed to perform a function. Memory 730 includes a random access memory (RAM), a read only memory (ROM), and/or another type of dynamic or static storage device (e.g., a flash memory, a magnetic memory, and/or an optical memory) that stores information and/or instructions for use by processor 720.

Storage component 740 stores information and/or software related to the operation and use of device 700. For example, storage component 740 can include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 750 includes a component that permits device 700 to receive information, such as via user input (e.g., a touch screen display, a keyboard, a keypad, a mouse, a button, a switch, and/or a microphone). Additionally, or alternatively, input component 750 can include a sensor for sensing information (e.g., a global positioning system (GPS) component, an accelerometer, a gyroscope, and/or an actuator). Output component 760 includes a component that provides output information from device 700 (e.g., a display, a speaker, and/or one or more light-emitting diodes (LEDs)).

Communication interface 770 includes a transceiver-like component (e.g., a transceiver and/or a separate receiver and transmitter) that enables device 700 to communicate with other devices, such as via a wired connection, a wireless connection, or a combination of wired and wireless connections. Communication interface 770 can permit device 700 to receive information from another device and/or provide information to another device. For example, communication interface 770 can include an Ethernet interface, an optical interface, a coaxial interface, an infrared interface, a radio frequency (RF) interface, a universal serial bus (USB) interface, a Wi-Fi interface, a cellular network interface, or the like.

Device 700 can perform one or more processes described herein. Device 700 can perform these processes based on processor 720 executing software instructions stored by a non-transitory computer-readable medium, such as memory 730 and/or storage component 740. A computer-readable medium is defined herein as a non-transitory memory device. A memory device includes memory space within a single physical storage device or memory space spread across multiple physical storage devices.

Software instructions can be read into memory 730 and/or storage component 740 from another computer-readable medium or from another device via communication interface 770. When executed, software instructions stored in memory 730 and/or storage component 740 can cause processor 720 to perform one or more processes described herein. Additionally, or alternatively, hardwired circuitry can be used in place of or in combination with software instructions to perform one or more processes described herein. Thus, implementations described herein are not limited to any specific combination of hardware circuitry and software.

The number and arrangement of components shown in FIG. 7 are provided as an example. In practice, device 700 can include additional components, fewer components, different components, or differently arranged components than those shown in FIG. 7. Additionally, or alternatively, a set of components (e.g., one or more components) of device 700 can perform one or more functions described as being performed by another set of components of device 700.

Figure 8:
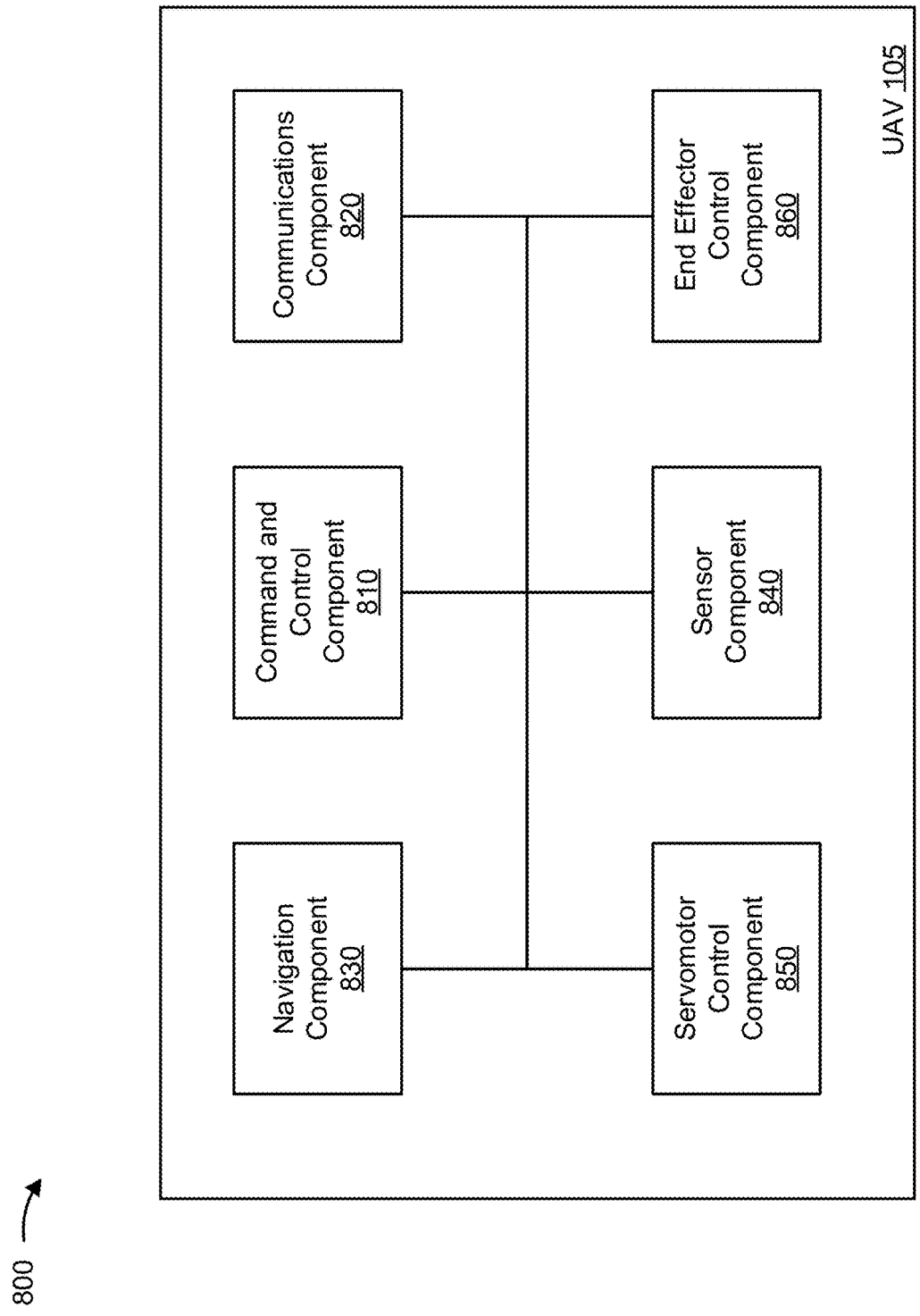
FIG. 8 is a diagram of example components of the UAV-mounted apparatus shown in FIG. 1.

FIG. 8 is a diagram of an example device 800 including example components of UAV 105. Although FIG. 8 is described with reference to UAV 105, in some implementations, UAV 105 and/or UAV-mounted apparatus 110 can include one or more of the components depicted in FIG. 8. As shown in FIG. 8, UAV 105 can include a command and control component 810, communications component 820, navigation component 830, sensor component 840, servomotor control component 850, and/or end effector control component 860.

Command and control component 810 includes one or more devices that can communicate with other components included in UAV 105 and/or UAV-mounted apparatus 110 to facilitate the provision of job performance functionality. For example, command and control component 810 can run an operating system and include one or more application programming interfaces for communicating with various components of UAV 105. In some implementations, command and control component 810 can include one or more applications that enable job performance functionality (e.g., mapping applications, coordinate system management, flight control, UAV-mounted apparatus control management, and/or the like).

Communications component 820 includes one or more devices that can communicate signals to and from one or more other components of UAV 105. For example, communications component 820 can receive radio signals from a device external to UAV 105 and/or transmit radio signals to a device external to UAV 105 (e.g., external devices might include UAV management device(s), UAV-mounted apparatus, wireless antennas used for positioning, and/or the like).

Navigation component 830 includes one or more devices that can enable UAV 105 to navigate from one location to another (e.g., navigate from a UAV start location to a job location and back to the start location). Navigation component 830 can facilitate navigation using a variety of techniques, including the use of a map and/or coordinate system. For example, navigation component 830 can receive or generate a coordinate map of an operational area for UAV 105 by using a grid of any size squares (e.g., 1 meter by 1 meter squares) and assigning coordinates to each square, enabling navigation using coordinates. In this example, squares of a grid can be assigned data relevant to the square, such as obstructions and/or data relevant to job performance.

In some implementations, navigation component 830 can use triangulation to facilitate navigation. For example, GPS signals might not be available or reliable while working inside a building, in which case navigation component 830 could use triangulation to determine positioning instead of GPS signals. For example, navigation component 830 could receive signal strength measurements from various antennas placed inside a building, and using the signal strength measurements and known coordinates of the various antennas, navigation component 830 can determine a position of UAV 105. Other information can also be used to facilitate navigation, including sensor input, such as proximity sensor input that provides data indicating nearby obstacles which might have a known location (e.g., within a coordinate system).

Sensor component 840 includes one or more sensors for obtaining sensor data, and communicating the sensor data to other components of UAV 105. For example, sensor component 840 can include a GPS sensor, a light detection and ranging (LIDAR) sensor, a temperature sensor, a barometer, an accelerometer, a gyroscope, a camera, and/or the like, which can provide output to navigation component 830 for use in navigating UAV 105 or to a servomotor control component 850 for use in controlling UAV-mounted apparatus 110.

Servomotor control component 850 includes one or more devices that control the servomotor(s) of UAV-mounted apparatus 110 that is connected to UAV 105. For example, servomotor control component 850 can be electrically connected to a servomotor of UAV-mounted apparatus 110 and control the rotation of the servomotor in a manner designed to facilitate performance of a given job. Servomotor control component 850 can also be in communication with other components of UAV 105, such as sensor component 840. Communication with other components of UAV 105 can, for example, enable servomotor control component 850 to place UAV-mounted apparatus 110 and/or end effector 140 of UAV-mounted apparatus 110 in a particular location. By way of example, in a situation where a job requires end effector 140 to be moved or held in a particular position and/or to hold end effector 140 relatively still while UAV 105 is hovering, input from various sensors (e.g., proximity sensor(s), accelerometer(s), camera(s), and/or the like) can be used by servomotor control component 850 to move or hold end effector 140 in the particular position and/or hold end effector 140 relatively still. In some implementations, servomotor control component 850 can enable manual control of UAV-mounted apparatus 110 (e.g., a user can remotely control the servomotors and position of an end effector using servomotor control component 850 and input from a camera).

End effector control component 860 includes one or more devices that control manipulation of end effector 140 of UAV-mounted apparatus 110 that is connected to UAV 105. In some implementations, end effector 140 can be manipulated in ways other than movement within space by the arms and servomotors of UAV-mounted apparatus 110, such as the use of electrical signal and/or mechanical manipulation. For example, a cutting tool can be manipulated in a manner designed to cut (e.g., by converging two blades, rotating a chain, and/or the like), a grabbing tool can be manipulated in a manner designed to grab an object (e.g., using a suction feature, activating an electromagnet, converging two or more gripping arms—or fingers—of an end effector, and/or the like), a fastener tool can be manipulated in a manner designed to apply and/or remove a fastener (e.g., screwing or unscrewing motions for a screwdriver, rotation motions for a nut and/or bolt, hammering motions for a nail, and/or the like), a camera tool can be manipulated to take a picture and/or video (e.g., by causing physical manipulation of a shutter button, sending an electronic signal to a camera, and/or the like), and other types of tools can be manipulated in ways designed to perform a given action relevant to a particular job.

The number and arrangement of components shown in FIG. 8 are provided as an example. In practice, device 800 can include additional components, fewer components, different components, or differently arranged components than those shown in FIG. 8. Additionally, or alternatively, a set of components (e.g., one or more components) of device 800 can perform one or more functions described as being performed by another set of components of device 800.

Figure 9:
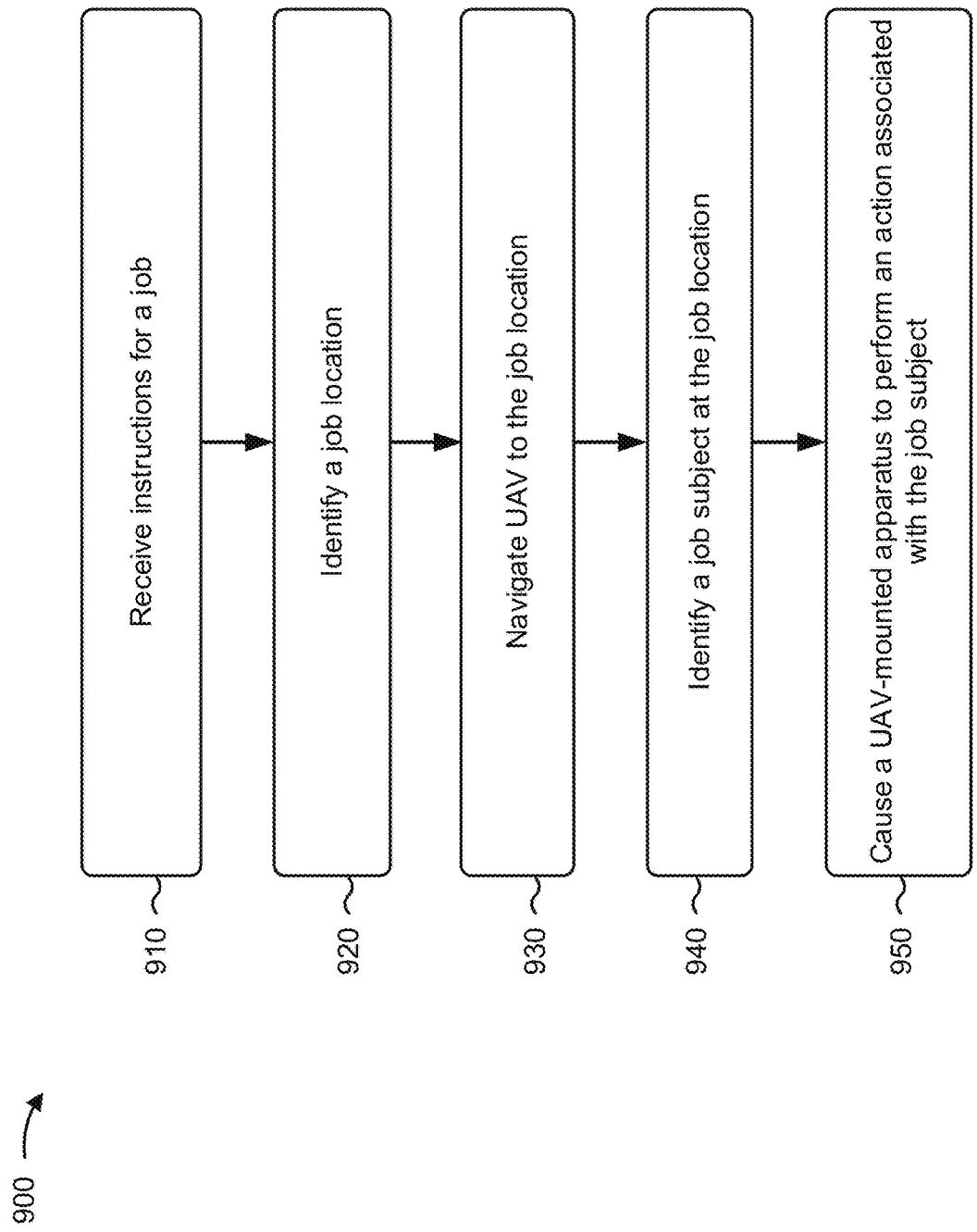
FIG. 9 is a flow chart of an example process for performing a job using the UAV-mounted apparatus shown in FIG. 1.

FIG. 9 is a flow chart of an example process 900 for performing a job using a UAV 105 and UAV-mounted apparatus 110. In some implementations, one or more process blocks of FIG. 9 can be performed by UAV 105, alone or in combination with UAV-mounted apparatus 110. In some implementations, one or more process blocks of FIG. 9 can be performed by another device or a group of devices separate from or including UAV 105, such as UAV management device 605.

As shown in FIG. 9, process 900 can include receiving instructions for a job (block 910). For example, UAV 105 can receive job data from UAV management device 605 (e.g., a server computer, mobile device, or the like, for receiving user input related to a job that can be performed by UAV 105). The instructions can be received via wired or wireless communications using direct communications and/or network communications. The instructions can include a variety of information related to the performance of a particular job.

In some implementations, the instructions can include location data for performing the job. Location data can include, for example, a starting location indicating where UAV 105 begins, one or more job locations indicating where a job is to be performed, and/or an end location where UAV 105 should land after performing the job. In some implementations, location data can include map data for at least a portion of the area in which the job is to be performed. Map data can include a variety of data designed to provide UAV 105 with location awareness regarding the location in which the job is to be performed, such as a coordinate-based grid that includes, for portions of the grid, data describing features of each portion of the grid (e.g., features such as obstacles, signal dead-zones, environmental characteristics, job-related data, and/or the like). In some implementations, location data can include navigation data for navigating from one location to another. For example, UAV management device 605 can provide a navigation path for UAV 105 (e.g., coordinates for UAV 105 to fly to during performance of the job).

In some implementations, the instructions can include job data that indicates information related to the job to be performed. For example, the job data can include an identifier for a subject of the job and a description of the action to be performed (e.g., an identifier for an object to be moved, an identifier for an object to be photographed, an identifier for an object to be cut, and/or an identifier for an object to be otherwise interacted with). In some implementations, a job can include a variety of actions to be performed. Using the data center cable management example, UAV 105 with UAV-mounted apparatus 110 can be provided with job data that identifies multiple cables to be moved and the destination ports for those cables.

In some implementations, the instructions can include data indicating the manner in which UAV 105 should end the job. For example, the instructions can include a landing location for UAV 105. In some implementations, the landing location can be the same as the starting location for UAV 105. For example, UAV 105 can start and end at a particular location (e.g., where UAV 105 can recharge batteries and/or await instructions for another job). In some implementations, the instructions can give UAV 105 a path and/or other navigational instructions to a landing location (e.g., in a manner designed to avoid collisions or interference with other UAVs performing jobs in the same area). The landing location can, in some implementations, be different from the starting location.

In this way, UAV 105 can receive instructions for a job. The instructions can enable UAV 105 to identify a job location and other job-related information which can be used to complete the job.

As further shown in FIG. 9, process 900 can include identifying a job location (block 920). For example, UAV 105 can identify a job location that is included in the instructions for the job. In some implementations, UAV 105 can use a map to identify the job location. For example, a map (e.g., provided by UAV management device 605 and/or stored by UAV 105) can include coordinates for various locations of interest within an operating area of UAV 105, and the job location can be identified by a set of coordinates. The type of coordinates can depend on the type of map and/or navigation used by UAV 105 (e.g., geographic coordinates can be used with GPS navigation techniques, and/or coordinates (e.g., (x, y) and/or (x, y, z) coordinate locations) can be used when navigation and/or mapping is performed using coordinate-based techniques).

In this way, UAV 105 can identify a job location for the job. Identifying the job location can enable UAV 105 to navigate to and perform the job.

As further shown in FIG. 9, process 900 can include navigating UAV 105 to the job location (block 930). For example, UAV 105 can navigate to the job location using navigation component 830 and command and control component 810. Navigation component 830 can use a map and one of a variety of navigational techniques to determine a flight path to the job location. Command and control component 810, alone or in combination with other components, facilitate moving UAV 105 to the job location (e.g., by activating rotors for UAV 105 flight).

In some implementations, UAV 105 can use indoor antennas to navigate to the job location. For example, one or more components of UAV 105 can receive signals from multiple indoor antennas placed throughout an area that includes the job location. The signal strength measurements and known locations of the indoor antenna (e.g., known by their inclusion in a map accessible to UAV 105) can be used to triangulate a position for the UAV 105. In some implementations, other navigational techniques, such as GPS navigation, can also be used to navigate to the job location.

In some implementations, a job can have multiple job locations (e.g., where multiple jobs, or actions, are to be performed in a single flight of UAV 105). In this situation, the order in which UAV 105 navigates to each job location can be determined in a variety of ways. For example, navigation can be performed in a manner designed to avoid obstacles (including other UAVs), in a manner designed to minimize total distance traveled, in a manner designed to prioritize particular jobs and actions before others, in a manner designed to have UAV 105 end in a particular location, and/or the like.

In this way, UAV 105 can navigate to the job location. Navigating to the job location enables UAV 105 to perform the job at the job location.

As further shown in FIG. 9, process 900 can include identifying a job subject at the job location (block 940). For example, UAV 105 can identify a subject or an object to be interacted with after arriving at or near the job location. The manner in which the job subject is identified can vary, for example, based on the job to be performed, the subject to be interacted with, and/or the manner in which the subject is to be interacted with.

By way of example, an object can be identified using a camera and object recognition techniques. Using the data center patch cable example, patch cables, ports, racks, and/or the like can have identifiers, such as textual identifiers, quick response (QR) code, bar code, and/or the like. The identifiers can be read by object recognition software, include a QR code reading application and/or optical character recognition application included in UAV 105 and/or UAV-mounted apparatus 110. As another example, object recognition techniques can be used to identify one or more objects in an image or video captured by a camera of UAV 105 and/or UAV-mounted apparatus 110.

In some implementations, user input can be used to identify the job subject. For example, camera images and/or video can be provided to a remote user (e.g., a user at a separate device such as UAV management device 605), and user input can be provided that identifies the job subject within the image and/or video. The user input can be provided to UAV 105 in a manner designed to identify, to UAV 105, the job subject.

In this way, UAV 105 can be used to identify the job subject at the job location. Identifying the job subject can enable UAV 105 to cause end effector 140 of UAV-mounted apparatus 110 to perform an action associated with the job subject.

As further shown in FIG. 9, process 900 can include causing a UAV-mounted apparatus to perform an action associated with the job subject (block 950). For example, UAV 105 can cause end effector 140 of UAV-mounted apparatus 110 to perform an action. The action to be performed can depend on a variety of things, such as the job to be performed, the type of end effector 140 used, and the particular job subject identified.

In some implementations, the action can include manipulating one or more servomotors in a manner designed to position the end effector of UAV-mounted apparatus 110. For example, end effector 140 might need to be in a particular position to perform the job (e.g., remove a cable, cut an object, drop off an object, grab an object), and the servomotors can be used to change the location of the end effector to facilitate performance of the job. Using the data center cable re-arrangement example, UAV 105 can cause one or more servomotors to position a grabbing tool at a cable identified at 940. Servomotors can be positioned using feedback from a variety of sources, including visual feedback from a camera and/or feedback from one or more sensors of UAV 105, such as a proximity sensor, accelerometer, and/or the like.

In some implementations, the action can include causing end effector 140 to take an action, such as causing end effector 140 to grab an object, release an object, cut an object, photograph an object, and/or otherwise manipulate and/or interact with an object. The actions that UAV 105 can cause might depend, for example, on end effector 140 being used and the job to be performed. In the data center cable re-arrangement example, UAV 105 can cause a gripping tool to grab and/or release the cable identified at 940. In addition, UAV 105 can cause end effector 140, in some implementations, to perform multiple different types of actions (e.g., a gripping tool might also be able to perform a pulling action to remove a cable and/or a pushing motion to insert a cable).

In some implementations, the action can include causing rotors of UAV 105 to reposition UAV 105 in a manner designed to facilitate performance of the job. For example, interactions with the subject of the job can be affected by moving UAV 105 in space with the rotors. Using the data center cable re-arrangement example, UAV 105 can cause a cable to be removed by moving UAV 105 away from the cable port after the gripping tool has grabbed the patch cable that is to be removed. Similarly, UAV 105 can cause the patch cable to be reinserted by controlling the rotors to move UAV 105 forward and plug the patch cable into the target port.

In some implementations, UAV 105 can perform multiple actions, such as those described above, in a manner designed to perform the job. For example, UAV 105 might use servomotors to position an end effector, cause the end effector to take an action, and activate certain rotors to facilitate a particular action in the performance of the job.

In this way, UAV 105 can cause the UAV-mounted apparatus to perform an action associated with the job subject. Performing an action associated with the job subject can enable UAV 105 and UAV-mounted apparatus to perform a variety of jobs with a variety of end effectors in a variety of ways.

Although FIG. 9 shows example blocks of process 900, in some implementations, process 900 can include additional blocks, fewer blocks, different blocks, or differently arranged blocks than those depicted in FIG. 9. Additionally, or alternatively, two or more of the blocks of process 900 can be performed in parallel.

Some implementations of UAV 105 and UAV-mounted platform 110 described herein can enable the performance of many different types of jobs in an automated or semi-automated manner. Jobs can be safely and efficiently relative to performance of jobs by other means (e.g., performed by a person or less efficient machine(s)). In addition, some jobs that might not otherwise be practicable to perform, such as jobs taking place in dangerous and/or elevated locations, might be easier to perform using a UAV 105 and UAV-mounted apparatus 110.

The foregoing disclosure provides illustration and description, but is not intended to be exhaustive or to limit the implementations to the precise form disclosed. Modifications and variations are possible in light of the above disclosure or can be acquired from practice of the implementations.

As used herein, the term component is intended to be broadly construed as hardware, firmware, or a combination of hardware and software.

To the extent the aforementioned embodiments collect, store, or employ personal information provided by individuals, it should be understood that such information shall be used in accordance with all applicable laws concerning protection of personal information. Additionally, the collection, storage, and use of such information might be subject to consent of the individual to such activity, for example, through well known "opt-in" or "opt-out" processes as might be appropriate for the situation and type of information. Storage and use of personal information can be in an appropriately secure manner reflective of the type of information, for example, through various encryption and anonymization techniques for particularly sensitive information.

It will be apparent that systems and/or methods, described herein, can be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features can be combined in ways not specifically recited in the claims and/or disclosed in the specification. Although each dependent claim listed below can directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and can be used interchangeably with "one or more." Furthermore, as used herein, the term "set" is intended to include one or more items (e.g., related items, unrelated items, a combination of related and unrelated items, etc.), and can be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:
1. A device, the device comprising:
    a first frame for physically connecting to an unmanned aerial vehicle (UAV);
    three or more support arms connected to and extending from the first frame;
    a first servomotor coupled to a first end of a first support arm of the three or more support arms,
        the first servomotor providing rotatable movement of the first support arm in a first plane, and
        the first servomotor being coupled to the first end of the first support arm using a first yoke;
    a second servomotor coupled to a first end of a second support arm of the three or more support arms,
        the second servomotor providing rotatable movement of the second support arm in a second plane that is different from the first plane, and
        the second servomotor being coupled to the first end of the second support arm using a second yoke;
    a second frame connected to the three or more support arms,
        the second frame being connected to a second end of the first support arm and a second end of the second support arm; and
    an end effector connected to the second frame.
2. The device of claim 1, where the three or more support arms are:
    substantially similar in length, and
    substantially parallel to each other.
3. The device of claim 1, where a third support arm, of the three or more support arms, is not connected to the first servomotor or the second servomotor.

4. The device of claim 1, where:
the first servomotor is coupled to the first end of the first support arm using a first pair of rotatable servo horn covers connected to the first yoke, and
the second servomotor is coupled to the first end of the second support arm using a second pair of rotatable servo horn covers connected to the second yoke.

5. The device of claim 1, where:
the first plane is substantially perpendicular to the second plane,
the first plane bisects the first support arm from the first end of the first support arm to the second end of the first support arm, and
the second plane bisects the second support arm from the first end of the second support arm to the second end of the second support arm.

6. The device of claim 1, where:
the second frame has:
a first degree of freedom provided by the first servomotor,
the first degree of freedom being horizontal translation; and
a second degree of freedom provided by the second servomotor,
the second degree of freedom being vertical translation.

7. The device of claim 1, where the first frame defines a housing for one or more pieces of equipment.

8. The device of claim 7, further comprising:
an end effector motor to interact with the end effector, the end effector motor being included in the housing and physically connected to the end effector.

9. A system comprising:
an unmanned aerial vehicle (UAV);
a first frame physically connected to the UAV;
two or more support arms connected to and extending from the first frame;
a first servomotor coupled to a first end of a first support arm of the two or more support arms,
the first servomotor providing rotatable movement of the first support arm in a first plane;
a second servomotor coupled to a first end of a second support arm of the two or more support arms,
the second servomotor providing rotatable movement of the second support arm in a second plane that is different from the first plane;
a second frame connected to the two or more support arms,
the second frame being connected to a second end of the first support arm and a second end of the second support arm, and
the second frame having:
a first degree of freedom provided by the first servomotor,
the first degree of freedom being horizontal translation; and
a second degree of freedom provided by the second servomotor,
the second degree of freedom being vertical translation; and
an end effector connected to the second frame.

10. The system of claim 9, further comprising:
an electrical connection between the UAV and one or more of the first servomotor or the second servomotor.

11. The system of claim 9, further comprising:
a servomotor control component to control rotation of the first servomotor and the second servomotor.

12. The system of claim 11, where:
the servomotor control component controls rotation of the first servomotor and the second servomotor based on input provided by a sensor component of the UAV.

13. The system of claim 9, further comprising:
an end effector control component to control the end effector.

14. The system of claim 13 where:
the end effector control component controls the end effector based on input provided by a sensor component of the UAV.

15. An apparatus mounted to an unmanned aerial vehicle (UAV), comprising:
a first frame physically connected to the UAV,
where the first frame defines a housing for one or more pieces of equipment;
two or more support arms connected to and extending from the first frame;
a first servomotor coupled to a first end of a first support arm of the two or more support arms, the first servomotor providing rotatable movement of the first support arm in a first plane;
a second servomotor coupled to a first end of a second support arm of the two or more support arms, the second servomotor providing rotatable movement of the second support arm in a second plane that is different from the first plane;
a second frame connected to the two or more support arms, the second frame being connected to a second end of the first support arm and a second end of the second support arm;
an end effector connected to the second frame; and
an end effector motor to interact with the end effector, the end effector motor being included in the housing and physically connected to the end effector.

16. The apparatus of claim 15, further comprising:
counterweight included in landing gear connected to at least one of the UAV or the first frame.

17. The apparatus of claim 15, further comprising:
a camera included in the housing to provide at least one of:
one or more photographs including the end effector, or
one or more videos including the end effector.

18. The apparatus of claim 15, where the end effector comprises a movable tool to interact with at least one object.

19. The apparatus of claim 15, further comprising:
a third support arm connected to and extending from the first frame.

20. The apparatus of claim 15, where:
the first servomotor is coupled to the first end of the first support arm using a first yoke, and
the second servomotor is coupled to the first end of the second support arm using a second yoke.

* * * * *